March 13, 1928.  C. H. PATTEN  1,662,327
SPRING SUSPENSION FOR AUTOMOBILES OR TRUCKS
Filed Jan. 19, 1924
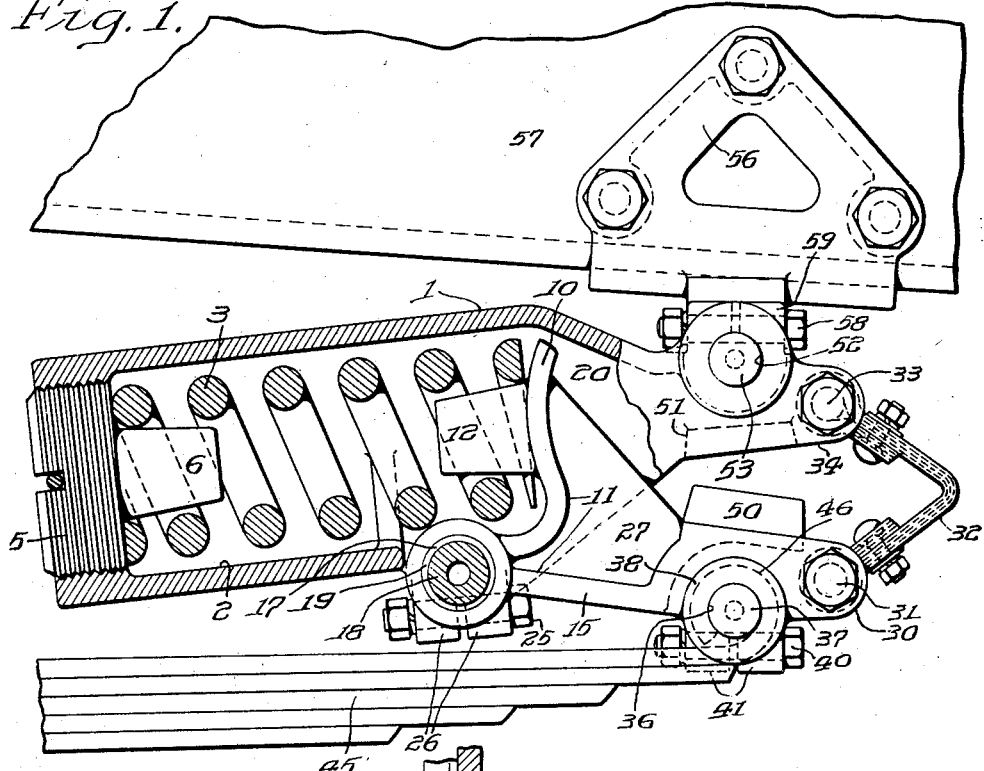
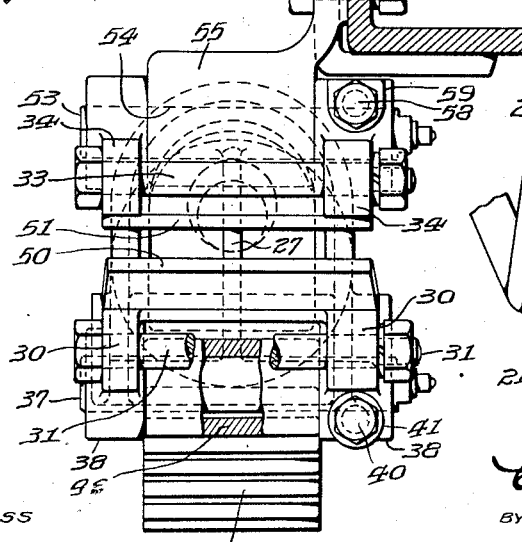
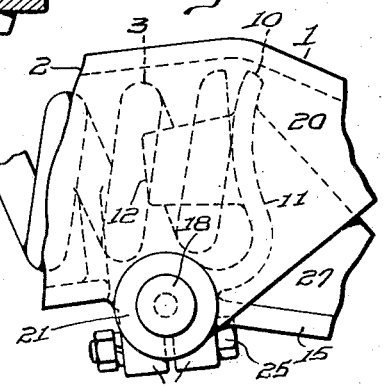
INVENTOR
Charles H. Patten
BY Cyrus N. Anderson
ATTORNEY
WITNESS
F. J. Hartman Patented Mar. 13, 1928.

1,662,327

UNITED STATES PATENT OFFICE.

CHARLES H. PATTEN, OF ALLENTOWN, PENNSYLVANIA, ASSIGNOR TO THE TRAYLOR ENGINEERING & MANUFACTURING COMPANY, OF ALLENTOWN, PENNSYLVANIA, A CORPORATION OF DELAWARE.

SPRING SUSPENSION FOR AUTOMOBILES OR TRUCKS.

Application filed January 19, 1924. Serial No. 687,164.

My invention relates to spring-suspension means for automobiles which is adapted to be interposed between the main supporting semi-elliptic springs and the chassis or body frame of an automobile or truck particularly between the rear ends of the front springs and body frame.

The general object of the invention is to provide a spring-suspension device of simple structure which may be substituted for the usual shackles which are employed for connecting the chassis or body frame to the ends of the main supporting semi-elliptic springs by which the said frame is supported,—particularly the rear ends of the front springs.

It is also an object of the invention to provide a structure of the character indicated comprising a coiled spring arranged in approximately horizontal position intermediate the said body frame and the said supporting spring which operates to protect the said body frame and the supporting springs against severe shocks and strains to which they may be subjected in use.

A further object is to provide means of the character indicated between the rear ends of the front supporting semi-elliptic springs and the said body frame whereby the chauffeur or operator of the automobile and persons riding in the front part of the same are not subjected to the full effect of the shocks to which the said automobilists may be subjected due to the passing over of uneven places on the road,—the device in that respect operating as a shock absorber.

To these and other ends the invention comprehends the construction as hereinafter fully described and particularly pointed out in the claims and as illustrated in the accompanying drawing in which I have illustrated one convenient form of mechanical embodiment thereof.

In the drawing:

Fig. 1 is a view showing a device embodying the invention partly in vertical longitudinal section and partly in elevation, and also showing portions of a spring and of a body frame between which the said device is situated and to which it is connected;

Fig. 2 is a view in rear elevation of the said device a portion of a side of a body frame being shown in transverse section and the end portion of a main spring being show in elevation; and Fig. 3 is a view in side elevation of a fragmentary portion of the said device.

Referring to the drawing: 1 designates a housing member comprising a tubular portion 2 within which a coiled compression spring 3 is mounted. One end of the said spring is seated upon an adjustable plug 5 which has screw-threaded engagement with the outer end of the tubular portion 2 of the said housing 1. The end of the spring which bears against the plug 5 is retained against lateral displacement by a projection 6 which extends inwardly of the tubular portion 2 from the plug 5. The opposite end of the spring 3 is seated against an upwardly projecting portion or arm 10 of a bell crank lever 11. The said portion or arm 10 is located within the housing 1 and extends transversely thereof. Lateral displacement of the said opposite end portion of the spring 3 is prevented by a projection 12 which extends inwardly of the tubular portion 2 of the housing 1 from the portion or arm 10. The other arm 15 of the bell crank lever extends rearwardly or away from the tubular portion 2 in general alinement therewith. The said bell crank lever is provided with a sleeve-like portion 17 which is mounted upon a pivot bolt 18. A bushing 19 is interposed between the sleeve 17 and pivot pin 18. The sleeve 17 extends between the opposite substantially parallel sides 20 of the rear portion of the housing 1. The pivot pin is supported in openings through the lower inner edge portions of the opposite side walls 20. In order to provide a wider bearing in the said walls for the pivot bolt 18 annular bosses 21 are provided upon the outer sides of the said walls. For the purpose of retaining the pivot bolt 18 in place I have provided a bolt 25 which extends through lugs 26 and engages a notch in the side of the said pivot bolt adjacent the far end portion thereof (having reference to Fig. 1 of the drawing).

For the purpose of strengthening and rendering more rigid the bell crank lever 11 a web 27 is interposed between and connects the arms 10 and 15.

The outer or rear end portion of the arm 15 is provided with depending lugs 30 at its opposite edges having openings therein within which a bolt 31 is mounted. The lower end of a re-bound strap 32 is secured to the bolt 31 while the opposite upper end thereof is secured to a bolt 33 mounted in the rear projecting end portions 34 of the opposite sides 20 of the housing. The opposite sides of the rear end portion of the arm 15 of the bell crank lever are provided with openings 36 within which a bolt 37 is secured. For the purpose of increasing the bearing surfaces of these openings annular bosses 38 are provided upon the outer sides of the rear end of the said arm. For the purpose of retaining the bolt 37 in place I have provided a bolt 40 which extends through lugs 41 and engages a notch in the right-hand end portion thereof (having reference to Fig. 2).

45 designates the rear end portion of a semi-elliptic front spring of an automobile or similar structure. The rear end of the top plate thereof terminates in a loop 46 which engages the bolt 37 whereby the rear end portion of the horizontally extending arm 15 is pivotally connected with the said spring 45.

A buffer block 50 of suitable material is secured upon the top of the rear end portion of the arm 15 with which a cross bar 51 upon the lower side of the rear end portion 34 of the housing 1 is adapted to contact due to the downward movement of the rear end portion of the housing, as when the truck passes over a particularly rough place in the road and also in case of a particularly heavy load upon the said truck.

The opposite sides of the rear end portion 34 of the housing are provided with openings 52 within which is situated a pivot bolt 53 which bolt extends through an opening 54 in an enlarged head portion 55 of a bracket 56 secured to a side 57 of a body frame or chassis. The pivot bolt 53 is retained in place by a bolt 58 which extends through lugs 59 and which engages a notch in the adjacent end portion of the said bolt 53.

It will be understood that one of the devices embodying my invention and as illustrated and described will be located intermediate the rear end of each of the front semi-elliptic springs and the adjacent portion of the side member of the body frame or chassis. Although the device embodying the invention is described as being located intermediate the rear end of the front semi-elliptic springs of an automobile structure it is to be understood that the invention is not limited with respect to its location.

By my invention I have provided a construction of spring-suspension device for the purpose indicated in which the spring is arranged in horizontal position in general parallel relation to the adjacent portion of the semi-elliptic spring to which the device is attached and the adjacent portion of the body frame or chassis of the automobile, by which arrangement I am enabled to eliminate most efficiently injurious strains upon the body frame, main springs, axles, etc., due to severe shocks which may be occasioned when traveling over rough roads. It also will be apparent that by the employment of my invention the cushioning effect of the supporting springs, to wit, the main semi-elliptic springs and the springs 3, is greatly increased.

The word "housing" is employed in the specification and claims in a descriptive sense to signify any suitable means for supporting the spring 3 and for effecting connection between the main supporting spring 45 and the body frame or chassis of an automobile or truck and not as a word or term of limitation.

Having thus described my invention, what I claim and desire to secure by Letters Patent is:

1. In a spring-suspension device for automobiles or trucks, the combination of a compression spring, a housing for the said spring, a bell crank lever pivoted to said housing at a point intermediate the opposite ends of the latter, one arm of said bell crank lever extending transversely of the said housing and against which one end of the said spring contacts, and the other arm of said lever extending away from the said spring and in general parallel relation to the axis thereof, means for pivotally connecting one end of the said housing to the body of an automobile or truck, means for pivotally connecting the outer end of the second named arm of said bell crank lever to the main supporting means for the said body, and a re-bound strap connecting the outer end of the last mentioned arm and the adjacent opposing end of the said housing.

2. In a spring-suspension device adapted to be interposed between the rear end of an elliptic spring for an automobile or truck and the adjacent opposed portion of the body thereof, the combination of a housing the front end of which is closed, said housing being located between the rear end portion of said spring and said body, a compression spring located within the said housing and having one end in contact with the closed end thereof, an angular lever pivotally connected with the said housing at a point intermediate the opposite ends thereof, one arm of which lever extends transversely of the said housing and against which the opposite end of the said spring contacts, and the other arm of said lever extending rearwardly in general parallel relation with the said housing, means for pivotally connecting the rear end of said housing to the body of the said automobile or truck, and means for connecting the rear end of the second named arm of said lever to the rear end of said spring.

3. In a spring-suspension device adapted to be interposed between the rear end of a front elliptic spring for an automobile or truck and the adjacent opposed portion of the body thereof, the combination of a housing having a tubular portion the front end of which is provided with an adjustable device, a compression spring located within the said tubular portion and having one end in contact with the said adjustable device, an angular lever pivotally connected with the said housing at a point intermediate the opposite ends thereof, one arm of which lever extends transversely of the tubular portion of the said housing and against which the opposite end of the said spring contacts, and the other arm of said lever extending rearwardly in general parallel relation with the said housing, means for pivotally connecting the rear end of said housing to the body of the said automobile or truck, means for connecting the rear end of the second named arm to the rear end of a spring, and a re-bound strap connecting the rear ends of the said housing and the said second named arm.

In testimony that I claim the foregoing as my invention I have hereunto signed my name this 15th day of January, A. D., 1924.

CHARLES H. PATTEN.